Oct. 31, 1950     A. G. RICHARDS     2,528,451
X-RAY GAUGE

Filed Dec. 28, 1945     2 Sheets-Sheet 1

INVENTOR.
Albert G. Richards.
BY
Harness, Dickey & Pierce.
ATTORNEYS.

Oct. 31, 1950  A. G. RICHARDS  2,528,451
X-RAY GAUGE
Filed Dec. 28, 1945  2 Sheets-Sheet 2
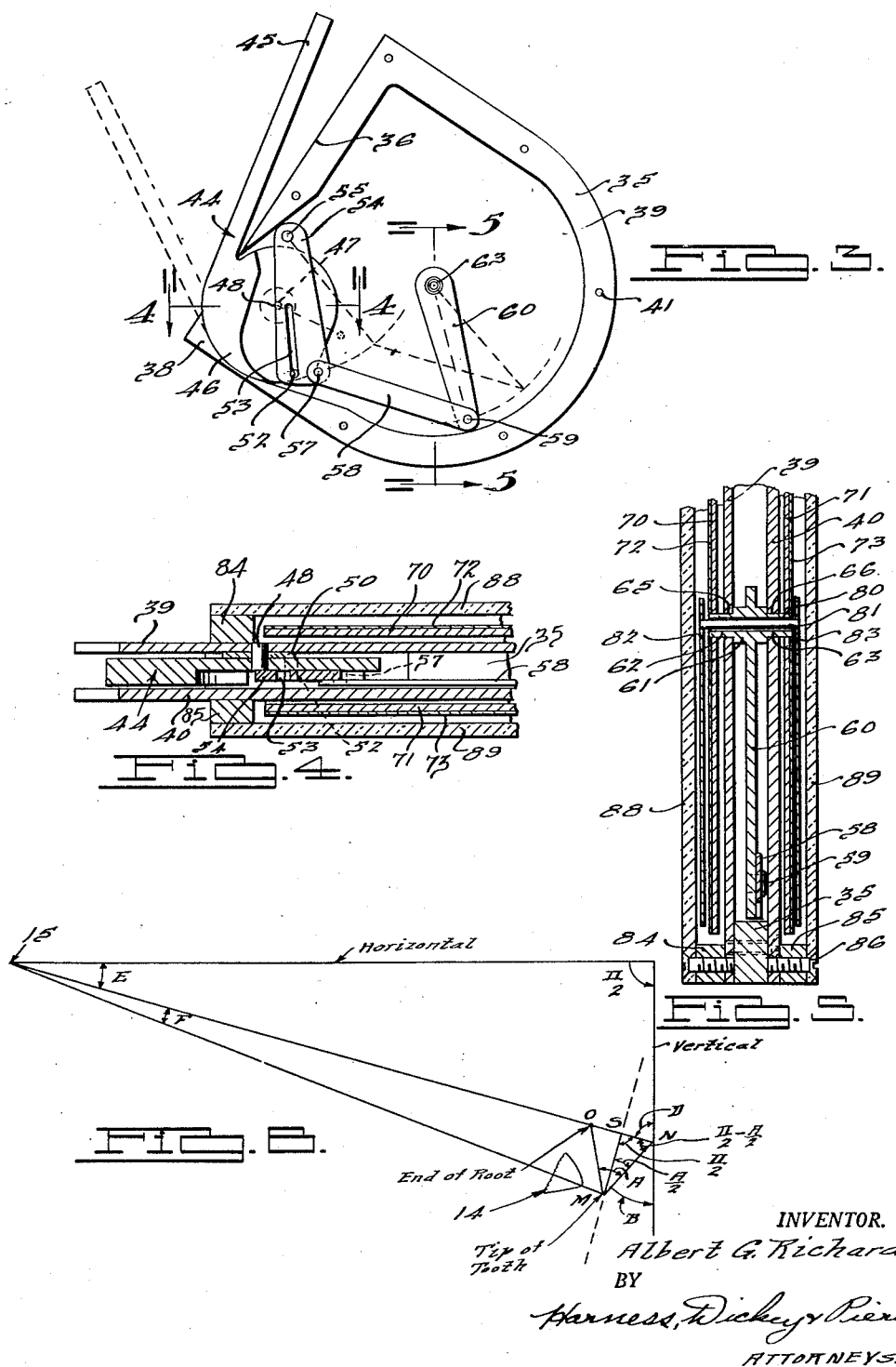
INVENTOR.
Albert G. Richards.
BY
Harness, Dickey & Pierce.
ATTORNEYS.

Patented Oct. 31, 1950

2,528,451

UNITED STATES PATENT OFFICE 2,528,451

X-RAY GAUGE

Albert G. Richards, Ann Arbor, Mich.

Application December 28, 1945, Serial No. 637,723

9 Claims. (Cl. 250—64)

The invention relates to the X-ray of teeth and it has particular relation to a device for determining adjustments to be made on the X-ray machine in order to secure the desired image on the film.

In taking X-rays of teeth, it is important that an accurate projection of the tooth on the film be obtained and in order to secure this accuracy of projection, the operator endeavors to so adjust the machine that the central ray will pass through the root end of the tooth and be perpendicular to the bisector of the angle between the tooth and film. It should be evident if a line from the target passes through the root end of the tooth and is perpendicular to the angle bisector, that the projection of the tooth on the film will be exactly the same length as the tooth. While the operator strives to obtain this result, considerable guess work usually is involved, particularly in determining the location of the angle bisector in an imaginary sense, and also in approximating the position of the root end of the tooth.

One object of the present invention is to provide a device which will enable the dentist or operator of the X-ray machine to readily and accurately determine necessary adjustments to be made on the machine in order to secure an accurate projection of tooth on the film.

Another object of the invention is to provide a device for this purpose which is easily operated so that the operator may readily determine adjustments without guess work.

Another object of the invention is to provide a device for the purpose mentioned which is extremely durable and accurate in character and which may be manufactured inexpensively.

Other objects of the invention will become apparent from the following specification, from the drawings relating thereto, and from the claims hereinafter set forth.

For a better understanding of the invention, reference may be had to the drawings wherein:

Fig. 3 is a view with certain parts removed illustrating interior working parts of the device shown by Fig. 2;

Fig. 4 is a cross-sectional view on a larger scale taken substantially along the line 4—4 of Fig. 3;

Fig. 5 is a cross-sectional view on a larger scale taken substantially along the line 5—5 of Fig. 3; and Fig. 6 is a mathematical diagram illustrating the manner in which adjustment of the X-ray machine is determined through the use of the invention.

Figure 1:
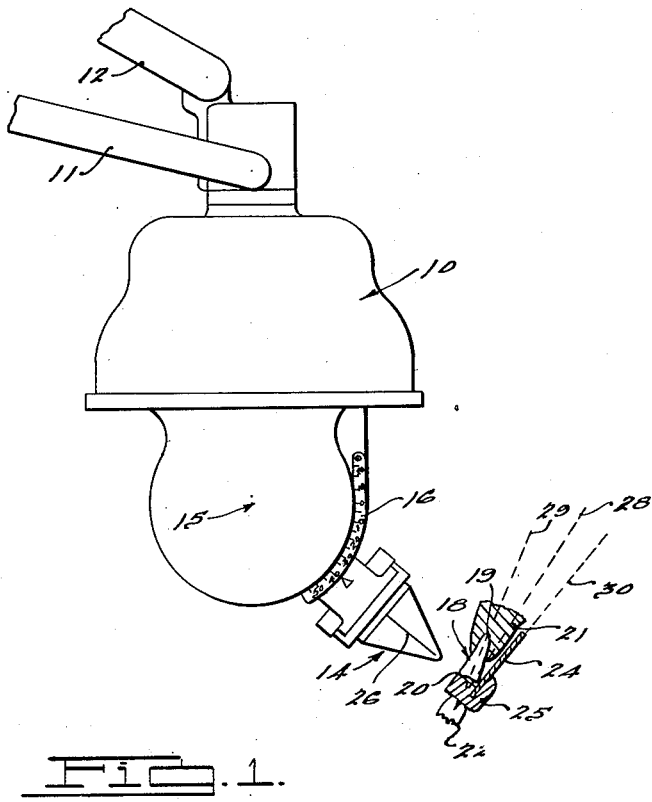
Figure 1 is an elevational view, partly in cross section, illustrating the relation of an X-ray machine, tooth and film when an X-ray picture is to be taken of the tooth.

Referring to Fig. 1, the X-ray machine is indicated at 10 and such machine is vertically adjustable through the use of vertically swingable arms 11 and 12. The machine includes a cone element 14 which is mounted to swing about a horizontal axis 15 coinciding with the source of the X-rays or target, and in order to indicate angles of adjustment of the cone, a scale 16 is provided on the machine along the path of adjustment of the cone. This scale has a zero indicia horizontally in line with the axis 15 and above and below this zero indicia the scale has additional indicia showing angle adjustments above and below the horizontal.

A tooth to be X-rayed is indicated at 18 and the end of the root and tip of the exposed part of the tooth are indicated respectively at 19 and 20. The gum is indicated at 21 and lower teeth are generally shown at 22, and when the X-ray picture is to be taken, a film indicated at 24 is placed in the mouth behind the tooth 18. This film may be mounted for instance in a holder 25 which may be gripped between the upper and lower teeth of the patient. In preparing to take the X-ray of the tooth, the machine is vertically adjusted and the angle of the cone is changed and normally the tip of the cone will be moved to a position close to the face. In X-ray machines of this general character, the cone has a center line 26 leading to the tip of the cone and this line is radial to the axis 15 and denotes the path of the central ray.

Previously, it was mentioned in a general way that it was desirable that the target be in line with the end 19 of the root and be perpendicular to the bisecting plane between the tooth and film. This bisector is generally indicated at 28 and bisects the angle between the plane of the tooth and the plane of the film indicated by lines 29 and 30. Therefore, one result to be obtained is adjustment of the machine so that the target and a line from this source extending through the end 19 of the tooth will be perpendicular to the plane 28.

The device constructed according to one form of the invention for accomplishing the results mentioned, comprises, as shown by Figs. 3, 4 and 5, a central metal frame or strip 35 which, as best shown by Fig. 3, has a straight edge 36, and an opening 38 at one end of the straight edge. On opposite sides of the frame 35, plates 39 and 40 are provided and these are fastened to the frame by means of screws 41. The two plates and frame as thus assembled, provide a generally closed interior space and this space houses certain functioning parts of the mechanism.

Now directing particular attention to Fig. 3, an arm 44 forming a part of the device, has an exterior straight extension 45 and a generally circular portion 46 located between the plates 39 and 40 and disposed partly in the gap 38 in the frame. The circular portion 46 of the arm is pivoted as indicated at 47 on a pin 48 mounted on the plate 39 and preferably a resilient washer of suitable character indicated at 50 may be provided on the pin between the arm and plate so as to compensate for looseness. The extension 45 and straight edge 36 are so arranged that by swinging the arm about the pivot 47, the extension portion 45 and the edge 36 can be brought into flush or flat fitting relation when the arm is adjusted clockwise as seen in Fig. 3 or the arm may be swung so as to form any angle between the extension and said edge.

The circular portion 46 of the arm is provided with a pin 52 which extends into a slot 53 in a second arm 54 between the plates, and this second arm is mounted on a pivot 55 projecting from the plate 39. Also the arm 54 is pivotally connected as indicated at 57 to a link 58 which in turn is pivotally connected as indicated at 59 to an arm 60. As best shown by Fig. 5, the latter arm has a hub portion 61 disposed between the plates 39 and 40 and smaller trunnion portions 62 and 63 which are turnably mounted in openings 65 and 66 in the plates. It should be evident from this description that if the arm 44 is swung counterclockwise, as seen in Fig. 3, the pin 52 will travel likewise about the pivot 47, and that in turn, the arm 54 will swing about the pivot 55. This movement of the arm 54 will cause the pin 57 to swing about the pivot 55 and in turn the link 58 will swing the arm 60 about the axis of the hub 61. The distance between the pivot 55 and the pivotal connection 57 is equal to the distance between the axis of hub 61 and the pivotal connection 59 so that the same angular movement imparted to arm 54 is imparted to arm 60. Also the pins 52 and 55 are equidistant from the center pivot 47. It should be evident that pin 52 will move through the same arc or angle as arm 45 moves, and if it be assumed that slot 53 is aligned with pin 55, the arm 54 will swing only through an angle half as large as the angle through which the arm swings. The slot 53 is slightly out of line, however, in so far as pivot 55 is concerned, for a compensating purpose which will be presently explained in connection with the mathematical diagram embodied in Fig. 6.

Figure 2:
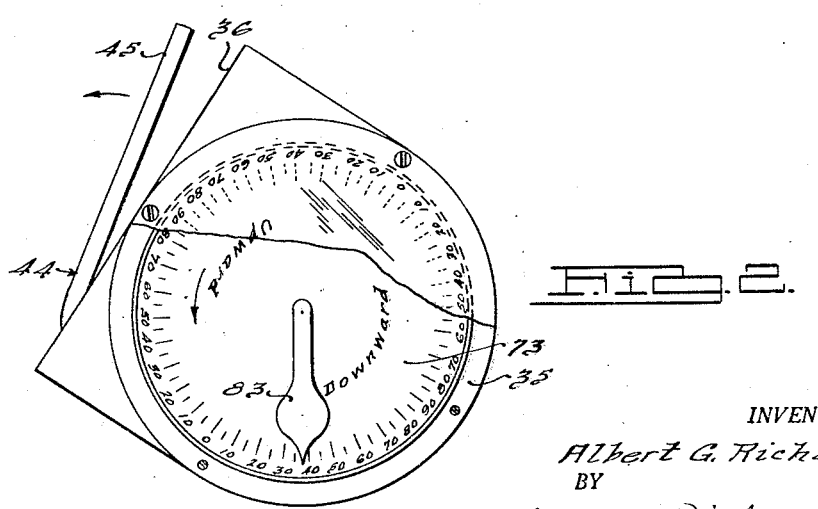
Fig. 2 is a plan view of a device constructed according to one form of the invention for determining the adjustment to be made on the X-ray machine.

Referring again to Figs. 4 and 5, the outer ends of the trunnions 62 and 63 pass through disks 70 and 71, respectively, and the openings in such disks are such as to obtain a slight press fit with the trunnions so that the trunnions will turn the disks when the arm 60 turns. Such disks 70 and 71 on their outer faces have angle indicating faces or scales 72 and 73, respectively, and these are identical. Each of the angle indicating faces 72 and 73 as shown by Fig. 2 is graduated to show angles ranging from zero to 90° in each quadrant with 0° marks diametrically opposite and the angle indicating marks are so arranged that when arm extension 45 is against edge 36, the diametric line between opposed zero marks is shifted clockwise as viewed in Fig. 2, through an angle of 7° with respect to such edge. This variation will be explained hereinafter. Attention is directed also to the fact that the words "downward" and "upward" are provided on each disk so as to indicate whether or not a downward or upward angular adjustment of the cone is to be effected.

Referring again to Fig. 5, the hub 61 has a central opening 80 and this opening receives a pin 81 which extends beyond the ends of the trunnions 62 and 63. Outwardly of the faces 72 and 73 the ends of the pin 81 are secured to hands or pointers 82 and 83, respectively, and each of such pointers may be shaped as shown in Fig. 2. The opening 80 is sufficiently large to permit the pin 81 to turn freely therein and as a result, the two hands 82 and 83 operate as pendulums and always will hang vertically.

In order to enclose the faces and pendulums, spacing rings 84 and 85 are secured to the plates 39 and 40 by screws 86 and such screws also secure glass or other transparent disks 88 and 89 to the rings. From this it is apparent that the device is entirely enclosed excepting for the projecting arm extension 45.

Before explaining the mathematical diagram in Fig. 6, it seems advisable to generally state the manner in which the device is used. Referring to both Figs. 1 and 2, the film is placed in the patient's mouth as shown in Fig. 1, and then the operator holds the device as seen in Fig. 2 in such manner as to align the edge 36 with the film 24. This may be done by manually holding the device at one side of the face of the patient so that with the mouth of the patient open, the edge 36 can be brought into alignment with the film through sighting along the edge. With the edge 36 aligned with the film 24, the arm extension 45 is now moved until it is aligned with the tooth. In other words, the operator brings the extension 45 and edge 36 into alignment with the two lines 29 and 30 shown in Fig. 1.

Any movement of the arm extension 45 swings the two faces 72 and 73 but the angular movement of the two faces is only half of the angular movement of the arm extension, subject to a compensating factor which will be mentioned in connection with Fig. 6. The pendulums remain in a vertical position during use of the device and their lower ends indicate a certain angle and the cone on the X-ray machine is adjusted to this angle. In the arrangement as shown, the adjustment is downward as shown by the word "downward" on the face, but it is evident that if the arm 45 and edge 36 were at the left side of the vertical as may be visualized in Fig. 2, the hands 82 and 83 would indicate an upward adjustment of the cone 14.

The cone is also raised vertically by means of the arms 11 and 12 until the tip of the cone is brought into proximity to the patient's face and with the center line 26 aligned with the tip of the tooth. It will be shown hereafter in connection with Fig. 6, that this alignment of the center line 26 of the cone with the tip of the tooth, automatically locates the target of the X-ray with the root end of the tooth and in such position that a line between the target and root end is perpendicular to the bisecting plane 28.

Now referring to Fig. 6, the line MO denotes the tooth, the line MN the film and the line MS the bisecting plane. A horizontal line is shown extending from the axis or target 15 and a vertical line corresponding to the position of the pendulum is shown extending through point N. With the lines MO and MN equal as is true with the length of the image the same as the length of the tooth, the $\angle$SMN is equal to half the $\angle$OMN. These angles are indicated respectively at $$\frac{A}{2} \text{ and } A$$

It is evident too that each of the base angles of the triangle MON is equal to $$\frac{\pi}{2}-\frac{A}{2}$$

$\angle$D is equal to $$\pi-\left(\frac{\pi}{2}-\frac{A}{2}\right)-B$$

and simplifying this, $$\angle D = \frac{\pi}{2}+\frac{\angle A}{2}-\angle B$$

$\angle$E, which is a cone adjustment angle, equals $$\frac{\pi}{2}-\angle D$$

and substituting the value of $\angle$D and simplifying, $$\angle E = \angle B - \frac{\angle A}{2}$$

Now interpreting this in connection with the device, the $\angle$B represents the angle between the pendulum and edge 36 and assuming that the arm extension 45 is against the edge 36, $$\frac{\angle A}{2} \text{ and } \angle A$$

would be zero and $\angle$E consequently would equal $\angle$B. However, if the arm extension is swung through the $\angle$A, $\angle$E must be decreased by the amount of $$\frac{\angle A}{2}$$

and this is effected by moving the faces 72 and 73 only through half its $\angle$A and so that the angle indicated under the pendulums will be reduced by the $$\frac{\angle A}{2}$$

The foregoing would indicate the angle of the cone if the center line 26 is in line with the root end of the tooth. While the device could be operated in this manner, it requires the operator to imagine the position of the root end of the tooth and, of course, this is not very desirable. It is much easier for the operator to align the center line of the cone with the exposed tip of the tooth and the device includes a compensating factor which enables adjustment of the cone angle with sufficient accuracy for this purpose.

Referring again to Fig. 6, if the cone angle is $\angle$E, the center line on the cone is in alignment with the point O but if $\angle$F can be determined, the center line of the cone can be aligned with the point M or tip of the tooth while still maintaining the target aligned with NO. Thus if the $\angle$F can be automatically indicated by the device, all the operator needs to do is to read the angle indicated by the pendulum and then bring the cone into position where its center line is in line with the tip of the tooth. Pursuant to this, it has been considered that the length of the average tooth is approximately one inch, while the tip of the cone is about seven inches from the target. With the tip of the cone proximate to the tooth, the $\angle$F can be generally determined by considering a triangle having one side as the length MO and its other side as the length from the tooth or target to the tooth or eight inches since the tip of the cone will be about one inch from the tooth. Such conditions, of course, would vary depending upon the $\angle$A. It is evident by assuming MO to equal one inch and the line from the target to point O as eight inches, that the $\angle$F may be determined under a wide range of conditions by purely mathematical computations. With $\angle$A equal to 0° as when the tooth and film are parallel, the tangent of $\angle$F would be 1/8 and $\angle$F would be about 7°.

The range of variation of $\angle$F has been calibrated into the shape and position of slot 53 so that it is slightly out of alignment with the pivot 55 and pin 52. It is evident from Figs. 2, 3 and 6 that the arm 54 and scale or face will move through slightly more than half the angle the extension 45 moves through as the latter moves counterclockwise and will move through slightly less than half the angle the extension moves through as the latter moves clockwise. Also it is evident that $\angle$F will slightly decrease with an increase in $\angle$A and vice versa. With the extension 45 against edge 36 as would be true if the film and tooth were parallel, the angle indicated by the pendulum is $\angle E + \angle F$ with $\angle$F equalling about 7° as represented by an initial clockwise swing of the 0° marks. If the extension 45 is now turned counterclockwise through $$\frac{\angle A}{2}$$

and held in position and the edge 36 then turned clockwise through $$\frac{\angle A}{2}$$

so as to leave the bisecting line unchanged, $\angle$E would remain the same but $\angle$F would decrease slightly. Thus the angle under the pendulum would finally be changed only slightly as represented by the slight change in $\angle$F.

From the foregoing it should be understood that if the angle between the extension 45 and edge is increased, the $\angle$F will decrease and if the angle between the edge 36 and the extension 45 decreases, $\angle$F will increase. Again it is evident that if the position of the device is altered with any given angle between the extension 45 and edge 36, the change in angularity under the pendulum will represent a change in $\angle$E only. The construction thus automatically compensates for changes in $\angle$F as the angle between the extension 45 and edge 36 changes and at the same time determines the $\angle$E for any position of the bisecting line.

Use of the device, of course, is very simple since all the operator need do is to bring the edge 36 and center arm 45 into alignment with the film and tooth and then read the angle under the pendulum and note whether it indicates an upward or downward adjustment. The cone is then adjusted through the angle indicated and the tip of the cone is brought into proximity to the face, as is usual in such cases, with the center line of the cone coinciding with the tip of the tooth. The operator now knows that for all practical purposes, the line between the target and root end of the tooth is perpendicular to the bisecting plane.

Although more than one form of the invention has been illustrated and described in detail, it will be apparent to those skilled in the art that various modifications may be made without departing from the scope of the claims.

What is claimed is:

1. A gage for use in the X-ray of teeth comprising a frame, a pendulum swingably supported on the frame so that it may swing about a horizontal axis, an arm swingably mounted on the frame, angle indicating means mounted on the frame to swing about the axis of the pendulum, means operatively connecting the arm and angle indicating means so that when the arm moves about its pivot, the angle indicating means turns about said axis through approximately half the angle the arm moves, and means modifying the operation of the connecting means so that with increasing angular movement of the arm relative to a fixed part of the frame, the movement of the angle indicating means progressively becomes more than half the angle the arm moves.

2. A gage for use in the X-ray of teeth comprising a frame, a pendulum swingably supported on the frame so that it may swing about a horizontal axis, an arm swingably mounted on the frame, angle indicating means mounted on the frame to swing about the axis of the pendulum, means operatively connecting the arm and angle indicating means so that when the arm moves about its pivot, the angle indicating means turns about said axis through approximately half the angle the arm moves, and means modifying the operation of the connecting means so that with increasing angular movement of the arm relative to a fixed part of the frame, the movement of the angle indicating means progressively becomes more than half the angle the arm moves, said modifying means including a slot and pin connection.

3. A gage for use in the X-ray of teeth comprising a frame, a pendulum swingably supported on the frame so that it may swing about a horizontal axis, an arm swingably mounted on the frame, angle indicating means mounted on the frame to swing about the axis of the pendulum, means operatively connecting the arm and angle indicating means so that when the arm moves about its pivot, the angle indicating means turns about said axis through approximately half the angle the arm moves, said connecting means being so constructed and arranged that said angle indicating means is swung through an initial angle of approximately seven degrees when said arm is against said frame.

4. A gage for use with an X-ray machine having a cone mounted for pivotal movement about a horizontal axis and including a scale for indicating various angular positions of said cone, said gage being adapted for use in the X-raying of teeth and automatically providing a reading corresponding to the reading on said scale to which said cone should be pivoted for obtaining an accurate X-ray picture of the desired tooth, said gage being adapted to be used externally of the patient's mouth and comprising a frame having an edge adapted to be disposed in parallel relation to the X-ray film, an arm pivotally mounted on said frame and adapted to be disposed in parallel relation to the axis of said tooth, a scale pivotally mounted on said frame and having readings corresponding to those on said scale on said machine, a pointer pivotally mounted on said frame and adapted to move along said scale to indicate various readings thereon, and cooperating means connected to said pointer and said second named scale effective to cause said pointer to indicate a reading dependent upon the angle between said arm and said edge and the angle between said edge and the horizontal and corresponding to the reading on said first named scale to which the cone of the X-ray machine should be set in taking an X-ray picture of said tooth in order that a ray of said machine passing through the root end of the tooth will be substantially perpendicular to the bisector of the angle between the axis of the tooth and the plane of the film when the central ray of the cone is directed at a predetermined visible portion of the tooth, and which reading includes a compensating angle compensating for the central ray of said cone being directed at said predetermined visible portion of said tooth rather than at said root end thereof.

5. A gage for use with an X-ray machine having a cone mounted for pivotal movement about a horizontal axis and including a scale for indicating various angular positions of said cone, said gage being adapted for use in the X-raying of teeth and automatically providing a reading corresponding to the reading on said scale to which said cone should be pivoted for obtaining an accurate X-ray picture of the desired tooth, said gage being adapted to be used externally of the patient's mouth and comprising a frame having an edge adapted to be disposed in parallel relation to the X-ray film, an arm pivotally mounted on said frame and adapted to be disposed in parallel relation to the axis of said tooth, a scale pivotally mounted on said frame and having readings corresponding to those on said scale on said machine, a pointer pivotally mounted on said frame and adapted to move along said scale to indicate various readings thereon, cooperating means connected to said pointer and said second named scale effective to cause said pointer to indicate a reading dependent upon the angle between said arm and said edge and the angle between said edge and the horizontal and corresponding to the reading on said first named scale to which the cone of the X-ray machine should be set in taking an X-ray picture of said tooth in order that a ray of said machine passing through the root end of the tooth will be substantially perpendicular to the bisector of the angle between the axis of the tooth and the plane of the film when the central ray of the cone is directed at a predetermined visible portion of the tooth, and which reading includes a compensating angle compensating for the central ray of said cone being directed at said predetermined visible portion of said tooth rather than at said root end thereof, said cooperating means comprising weighted means adapted to urge said pointer toward a vertically downward position, means interconnecting said arm and said scale of said gage whereby movement of said arm through a predetermined angle effects movement of said scale through an angle substantially equal to one half of said predetermined angle, said scale on said gage being so connected to said arm that when the angle between said arm and said edge is zero and said edge extends vertically up and down said pointer indicates a predetermined initial compensating angle dependent upon distance at which the target of the X-ray machine is to be disposed from said tooth and the distance between the root end of said tooth and the predetermined point thereon at which the central ray of the X-ray machine is to be directed.

6. A gage for use in the X-ray of a tooth wherein the X-ray machine includes the usual target and a cone swingable about the target, which comprises a frame, a pair of angularly adjustable means on the frame adapted to be aligned respectively with the tooth and with a film held behind the tooth so that the angle between said adjustable means will be substantially the same as that between the tooth and film, means for indicating angle adjustments of said cone including a scale element pivotally mounted on the frame and a pendulum pointer freely swingable on said frame about a horizontal axis in response to the force of gravity and means operatively connecting said scale element and the angularly adjustable means and automatically operable, upon adjustment of the latter so that it is visually aligned with the tooth and film, to pivot said scale element to a position in which the angle adjustment indicated by said pendulum pointer on said scale element will be that at which the centerline of the cone must be directed relative to the horizontal with the apex of the cone in proximity to and pointed at a predetermined part of the tooth in order to have a line between the target and root end of the tooth substantially perpendicular to the plane bisecting the angle between the tooth and film.

7. A gage for use in the X-ray of a tooth wherein the X-ray machine includes a target and a cone swingable about the target, which comprises a frame, a pair of angularly adjustable means on the frame adapted to be aligned respectively with the tooth and with a film held behind the tooth so that the angle between said adjustable means will be substantially the same as that between the tooth and film, a pendulum pointer freely swingable about a horizontal axis on the frame in response to the force of gravity, an angle indicating scale element mounted on the frame for pivotal movement about said axis, and means operatively connecting the angularly adjustable means and scale element and automatically operable when the angle between said angularly adjustable means is changed through a given angle to pivot the scale element through approximately half said given angle.

8. A gage for use in the X-ray of teeth comprising a frame, a pendulum pointer freely swingably supported on the frame so that it may swing about a horizontal axis in response to the force of gravity, an angle indicating scale element mounted on the frame for pivotal movement about said axis, an arm mounted on the frame for pivotal movement about a second axis spaced from said axis, and means connecting the arm to the scale element and automatically operable to turn the latter through approximately half the angle upon movement of the arm through a given angle.

9. A gage for use in the X-ray of a tooth wherein the X-ray machine includes the usual target, a cone swingable about the target in a vertical plane and a scale having various readings therealong corresponding to varying inclinations of the cone, said gage comprising a frame, a pair of angularly adjustable means on the frame adapted to be aligned respectively with the tooth and with a film held behind the tooth so that the angle between the said adjustable means will be substantially the same as that between the tooth and film, means for indicating angular positions for said cone and including a plate including a scale having readings corresponding to those on said scale on the X-ray machine and means connecting said angularly adjustable means and said plate and automatically operable upon movement of said pair of angularly adjustable means to positions in which they are respectively aligned with the tooth and the film to pivot said plate to a position in which said means for indicating angular positions will indicate the reading corresponding to that at which the X-ray machine cone should be set so that with the apex of the cone in proximity to and pointed at a predetermined part of the tooth, a line between the target and root end of the tooth will be substantially perpendicular to the plane bisecting the angle between the tooth and film.

ALBERT G. RICHARDS.

REFERENCES CITED

The following references are of record in the file of this patent:

UNITED STATES PATENTS

| Number | Name | Date |
| --- | --- | --- |
| 1,408,778 | Raper | Mar. 7, 1922 |
| 1,963,702 | Jackson | June 19, 1934 |
| 2,127,502 | DeWeal | Aug. 23, 1938 |